United States Patent
Gingawa (10) Patent No.: US 10,599,270 B2
(45) Date of Patent: Mar. 24, 2020

(54) INFORMATION PROCESSING APPARATUS, CONFERENCE SYSTEM, AND CONTROL METHOD OF INFORMATION PROCESSING APPARATUS

(71) Applicant: Nobumasa Gingawa, Kanagawa (JP)

(72) Inventor: Nobumasa Gingawa, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/191,889

(22) Filed: Nov. 15, 2018

(65) Prior Publication Data

US 2019/0087054 A1 Mar. 21, 2019

Related U.S. Application Data

(63) Continuation of application No. PCT/JP2017/018257, filed on May 15, 2017.

(30) Foreign Application Priority Data

May 26, 2016 (JP) ................. 2016-105225
Oct. 6, 2016 (JP) ................. 2016-197975

(51) Int. Cl.
  *G06F 3/042* (2006.01)
  *H04L 29/06* (2006.01)
  (Continued)

(52) U.S. Cl.
  CPC ........ *G06F 3/0425* (2013.01); *G06F 3/03545* (2013.01); *G06F 3/04883* (2013.01);
  (Continued)

(58) Field of Classification Search
  USPC .......................................... 348/14.01–14.09
  See application file for complete search history.

(56) References Cited

U.S. PATENT DOCUMENTS

| 6,429,856 B1 | 8/2002 | Omura et al. |
| 9,467,654 B2 | 10/2016 | Kasatani et al. |

(Continued)

FOREIGN PATENT DOCUMENTS

| JP | 2002-204437 | 7/2002 |
| JP | 2007-214808 | 8/2007 |
| JP | 2015-207819 | 11/2015 |

OTHER PUBLICATIONS

International Search Report dated Aug. 11, 2017 in PCT/JP2017/018257 filed on May 15, 2017.

(Continued)

*Primary Examiner* — Maria El-Zoobi
(74) *Attorney, Agent, or Firm* — Oblon, McClelland, Maier & Neustadt, L.L.P.

(57) ABSTRACT

An information processing apparatus includes a video data processor configured to process video data output from an imaging unit; a drawing data processor configured to process drawing data written onto an input display unit; and a mode switch controller configured to set a first mode for a period during which a writing action is not performed onto the input display unit and a second mode for a period during which a writing action is performed onto the input display unit. The video data processor reduces an amount of the video data in the second mode so as to be smaller than an amount of the video data in the first mode. The drawing data processor reduces an amount of the drawing data in the first mode so as to be smaller than an amount of the drawing data in the second mode.

11 Claims, 5 Drawing Sheets

(51) Int. Cl.
   *H04M 7/00*      (2006.01)
   *H04M 3/56*      (2006.01)
   *H04N 7/14*      (2006.01)
   *G06F 3/0354*    (2013.01)
   *H04N 7/15*      (2006.01)
   *G06F 3/0488*    (2013.01)

(52) U.S. Cl.
   CPC ............ *H04L 65/403* (2013.01); *H04L 65/80* (2013.01); *H04M 3/567* (2013.01); *H04M 7/0027* (2013.01); *H04N 7/147* (2013.01); *H04N 7/15* (2013.01); *G06F 2203/04803* (2013.01)

(56) References Cited

U.S. PATENT DOCUMENTS

| | | | |
|---|---|---|---|
| 2003/0095570 A1 | 5/2003 | Uramatsu et al. | |
| 2007/0106950 A1 | 5/2007 | Hutchinson et al. | |
| 2011/0279350 A1 | 11/2011 | Hutchinson et al. | |
| 2012/0229589 A1* | 9/2012 | Barrus .................. | H04N 7/147 348/14.08 |
| 2012/0274733 A1 | 11/2012 | Yano | |
| 2012/0301863 A1* | 11/2012 | Bijlani .................. | G09B 19/00 434/362 |
| 2012/0320158 A1 | 12/2012 | Junuzovic et al. | |
| 2013/0339861 A1 | 12/2013 | Hutchinson et al. | |
| 2013/0339880 A1 | 12/2013 | Hutchinson et al. | |
| 2013/0339888 A1 | 12/2013 | Hutchinson et al. | |
| 2014/0006976 A1 | 1/2014 | Hutchinson et al. | |
| 2014/0085166 A1 | 3/2014 | Hutchinson et al. | |
| 2014/0376740 A1 | 12/2014 | Shigenaga et al. | |
| 2015/0054791 A1 | 2/2015 | Omura | |
| 2015/0146095 A1 | 5/2015 | Yano | |
| 2015/0304416 A1 | 10/2015 | Higashi | |
| 2016/0162250 A1 | 6/2016 | Dunn et al. | |
| 2016/0202878 A1 | 7/2016 | Dunn et al. | |
| 2017/0099453 A1 | 4/2017 | Junuzovic et al. | |
| 2017/0139570 A1 | 5/2017 | Dunn et al. | |
| 2017/0142370 A1 | 5/2017 | Dunn et al. | |
| 2017/0205984 A1 | 7/2017 | Dunn et al. | |

OTHER PUBLICATIONS

Written Opinion dated Aug. 11, 2017 in PCT/JP2017/018257 filed on May 15, 2017.

* cited by examiner

|  | VIDEO PRIORITY MODE | DRAWING PRIORITY MODE |
|---|---|---|
| AUDIO | HIGH QUALITY | HIGH QUALITY |
| VIDEO | HIGH QUALITY (DATA AMOUNT: LARGE) | LOW QUALITY (DATA AMOUNT: SMALL) |
| DRAWING | LOW QUALITY (DATA AMOUNT: SMALL) | HIGH QUALITY (DATA AMOUNT: LARGE) |

INFORMATION PROCESSING APPARATUS, CONFERENCE SYSTEM, AND CONTROL METHOD OF INFORMATION PROCESSING APPARATUS

CROSS-REFERENCE TO RELATED APPLICATIONS

The present application is a continuation application of International Application No. PCT/JP2017/018257, filed May 15, 2017, which claims priority to Japanese Patent Application No. 2016-105225, filed May 26, 2016, and Japanese Patent Application No. 2016-197975, filed Oct. 6, 2016. The contents of these applications are incorporated herein by reference in their entirety.

BACKGROUND OF THE INVENTION

1. Field of the Invention

The present invention relates to an information processing apparatus, a conference system, and a control method of the information processing apparatus.

2. Description of the Related Art

In recent years, a conference system (also referred to as "remote conference system", "teleconference system", and "video-conference system") in which a remote conference (also referred to as "teleconference" and "video-conference") is held by making a connection to a terminal device (also referred to as "conference terminal") arranged at a remote location (site concerned) via a network such as the Internet has been widely used.

The conference terminal in the conference system is arranged in a conference room and the like at each location concerned and exchanges an image and audio of an attendee of the conference with a conference terminal at a counterparty to hold a remote conference. Specifically, each conference terminal receives video data and audio data transmitted from the conference terminal at the counterparty, outputs and displays a conference screen using the received video data in a display unit, and outputs the audio data via a speaker while imaging the conference attendee present in the remote conference by a camera, collecting sounds of the conference attendee by a microphone, and transmitting video data (image data) and audio data to the conference terminal at the counterparty.

Besides, there has been a demand not only for exchanging video data and audio data but also for sharing, with the counterparty connected, a content written to image data of information material and the like displayed during the conference and a newly written content in the conference system. Conventionally, there is only a method of actually imaging by a camera and showing the information material with hand-written notes in a case of sharing a hand-written content and therefore the hand-written content is not reflected at the counterparty connected.

For one solution, a conference system capable of not only exchanging video data and audio data but also sharing a content written on a touch panel (drawing data) with the counterparty connected by using a conference terminal provided with an interactive whiteboard (electronic whiteboard) including the touch panel has been proposed.

In the conference terminal using the interactive whiteboard, there is a case where a network bandwidth sufficient for transmission/reception of data including video data, audio data, and drawing data cannot be secured depending on a congestion situation of a line in realizing a communication by using a network such as the Internet used by many and unspecified users and it is necessary to allocate resources within a limited network bandwidth. Therefore, the conference terminal itself sets an upper limit of a usage bandwidth, encodes the data including the video data, audio data, and drawing data into a transmittable size, and then transmits the encoded data to the site of the counterparty.

The drawing data, while indicating written content data here, normally includes data of information material such as a document and a drawing as a target of writing (information material which is shared between own site and the site of the counterparty). In other words, since the drawing data in the conference system normally includes screen-shared data such as the information material which is displayed in a display unit of the conference terminal, it is necessary to secure a network bandwidth sufficient for the data transmission/reception.

Japanese Laid-open Patent Publication No. 2002-204437 discloses that a communication device, which is for example used in a teleconference, transmits data encoded by an object encoding system via a transmission line capable of providing a QoS (Quality Of Service) based service, such as the ATM (Asynchronous Transfer Mode). The communication device selects a service class suitable for the real time situation to transmit data in transmitting multiple pieces of object data, thereby reducing the communication cost as a whole while realizing data transmission in the suitable service class.

Incidentally, it is considered in the conference terminal using the interactive whiteboard that the kind of important information differs depending on the use scene. For example, in a conference of making a face-to-face discussion with the counterparty, the important information is video data since the recognition of expressions of the counterparty is needed. In a conference of sharing drawings and documents and making explanations by inserting additional writings such as descriptions and notes onto the drawings and the documents, the important information is, in contrast, drawing data since a recognition of the written content is needed.

However, data processing which takes account of and is appropriate to the use scene is not performed with respect to the data such as the video data and the drawing data in the conventional conference terminal using the interactive whiteboard.

SUMMARY OF THE INVENTION

According to one aspect of the present invention, an information processing apparatus includes an imaging unit, a video data processor, an input display unit, a drawing data processor, a transmitter, a detector, and a mode switch controller. The imaging unit is configured to image a predetermined range. The video data processor is configured to process video data output from the imaging unit. The input display unit is configured to display video data and drawing data received from another information processing apparatus to be connected, and receive writing. The drawing data processor is configured to process drawing data written onto the input display unit. A transmitter is configured to transmit, to the other information processing apparatus, the video data having been processed by the video data processor and the drawing data having been processed by the drawing data processor. The detector configured to detect whether a writing action is performed on the input display unit. The mode switch controller is configured to set a first mode for a period during which the writing action is not performed onto the input display unit and a second mode for a period during which the writing action is performed onto the input display unit. At least one of the video data processor and the drawing data processor changes an amount of the data to be processed amount from a predetermined level, depending on the detection of the writing action. The video data processor reduces an amount of the video data in the second mode so as to be smaller than an amount of the video data in the first mode. The drawing data processor reduces an amount of the drawing data in the first mode so as to be smaller than an amount of the drawing data in the second mode.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment has an object to provide an information processing apparatus capable of enabling communication in data quality suitable for the use scene by executing data processing suitable for the use scene with respect to each of the video data and the drawing data.

A configuration according to the present invention will be explained in detail below based on an exemplary embodiment illustrated in FIGS. 1 to 8.

Configuration of Conference System

A configuration of a teleconference system as an embodiment of a conference system according to the present invention will be explained.

Figure 1:
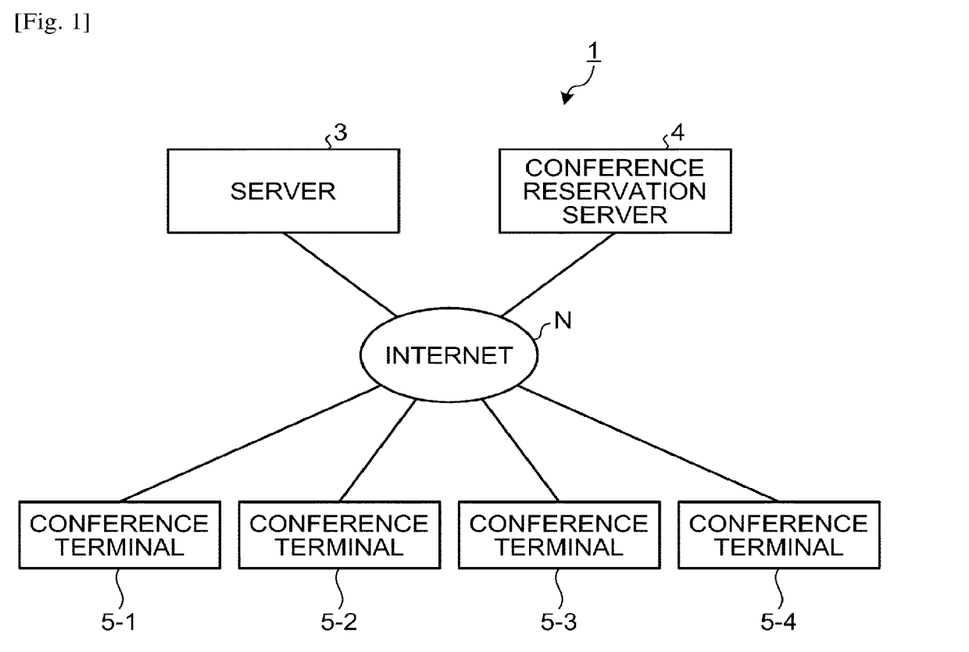
FIG. 1 is a block diagram illustrating an example of a configuration of a teleconference system.

FIG. 1 is a block diagram illustrating an example of a configuration of a teleconference system 1. As illustrated in FIG. 1, the teleconference system 1 is provided with a server 3, a conference reservation server 4, and a plurality of conference terminals 5 (5-1, 5-2, 5-3, 5-4 . . . ), which are connected via a network N such as the Internet.

The server 3 and the conference reservation server 4 can be each a server computer, a workstation, and the like. The conference terminal 5 can be a dedicated conference terminal device (information processing apparatus) provided with an electronic whiteboard or an interactive whiteboard; or a conference terminal device (information processing apparatus) including a personal computer connected to an electronic whiteboard or an interactive whiteboard.

The server 3 performs monitoring on whether a connection of the communication with individual conference terminals 5 is established, calling the conference terminal 5 arranged at a site concerned participating the teleconference (participating location) at the time of the start of the conference, and transferring, to the conference terminal 5 at the counterparty (the other participating site), video data, audio data, and drawing data transmitted from the conference terminal 5 at the participating site whose connection of the communication is established in response to the calling during the teleconference.

The conference reservation server 4, which includes a function of managing a status of a conference reservation, is enabled to be connected to an information processing terminal other than the conference terminal 5. For example, it is possible for an organizer of the conference, by inputting conference information including a time and date, a place, a participant, a role, a conference terminal to be used of the conference to be held, and the like in advance to the conference reservation server 4, to manage the status of the conference reservation.

Each of the conference terminals 5 is arranged in a conference room and the like at the remote site concerned and operated by an attendee of the teleconference. The conference terminal 5 at each participating site during the teleconference transmits video data of the attendee of the conference captured by a camera 51 as explained later, audio data of the attendee of the conference collected by a microphone 52, drawing data onto the interactive whiteboard, and the like to the server 3. The conference terminal 5 also receives video data, audio data, drawing data, and the like, which are transmitted from another conference terminal 5 at another participating site and then transferred by the server 3, then outputs and displays the video/drawing data as a conference screen on a touch panel display unit 54, and outputs the voice data from a speaker 55.

For example, in a teleconference in which three conference terminals 5-1 to 5-3 illustrated in FIG. 1 participate in the teleconference system 1, the video data and the audio data transmitted from the conference terminal 5-1 are not transferred to a conference terminal 5-4 while being transferred to the conference terminals 5-2 and 5-3 which are the counterparties by the control of the server 3. Similarly, the video data and the audio data transmitted from the conference terminal 5-2 and the conference terminal 5-3 are not transferred to the conference terminal 5-4 while being transferred respectively to the conference terminals 5-1 and 5-3 and to the conference terminals 5-1 and 5-2 which are respectively the counterparties by the control of the server 3. In this manner, the teleconference is held between/among at least two participating sites each at which the conference terminal 5 whose connection of the communication with the server 3 is established is arranged in the teleconference system 1.

Figure 2:
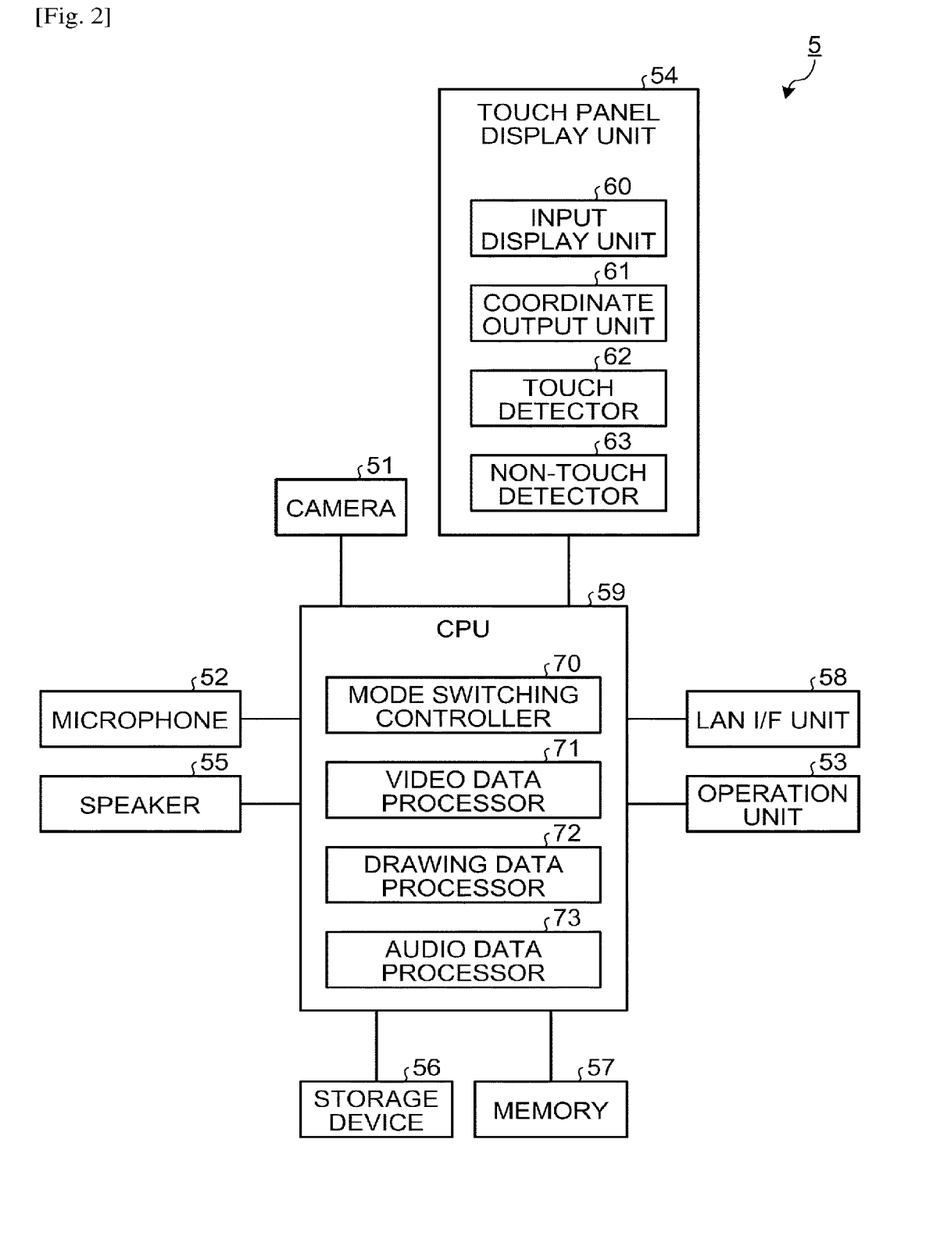
FIG. 2 is a block diagram illustrating an example of a major internal configuration of a conference terminal.

Configuration of conference terminal FIG. 2 is a block diagram illustrating an example of a major internal configuration of the conference terminal 5 using the interactive whiteboard. As illustrated in FIG. 2, the conference terminal 5 is provided with the camera 51, the microphone 52, an operation unit 53, the touch panel display unit 54, the speaker 55, a storage device 56, a memory 57, a LAN interface (I/F) unit 58, and a CPU 59.

The camera 51, which obtains an image of the attendee of the conference, images a range in the conference room and outputs generated video data to the CPU 59 as needed. The camera 51 is configured by using a wide angle lens, for example and arranged at an appropriate place in the conference room before the start of the teleconference so that all the conference attendees are included in the range of the field of view (angle of view) thereof.

The microphone 52, which is an audio input unit that inputs an audio of the attendee of the conference, outputs collected audio data of the attendee of the conference as needed. As the microphone 52, a built-in microphone or an external microphone of a USB type or an analog type can be used. Alternatively, a microphone array unit including a plurality of microphones can also be used.

The operation unit 53, which is realized by an input device such as a keyboard, a mouse, and various kinds of switches, outputs data input depending on an operational input to the CPU 59.

The touch panel display unit 54 is an input display device including a display function and a touch panel function. The touch panel display unit 54 includes an input display unit 60 (touch panel display) that displays video data and drawing data input from the CPU 59 and also receives an input for writing letters, a diagrammatic drawing, an image, and the like by using an electronic stylus (electronic writing device) or a finger by a user. The touch panel display unit 54 includes a coordinate output unit 61 that outputs the coordinates at which a touch onto the input display unit 60 is detected to the CPU 59.

The touch panel display unit 54 includes a touch detector 62 that detects that an electronic stylus, a finger, or the like is in touch (the fact of being in the middle of writing) and a non-touch detector 63 that detects the electronic stylus, a finger, or the like through no contact (without touch).

The non-touch detector 63 includes a proximity sensing function of detecting that an electronic stylus, a finger, or the like is made close to the input display unit 60 (called "hover detection"). The non-touch detector 63 of the touch panel display unit 54, which can be realized by a display-integrated capacitive touch panel, for example, is configured to perform the hover detection when an electronic stylus, a finger, or the like is made close to the touch panel, and the sensor then reacts to a capacitance of the stylus or the human body. The input method and the display method are not specifically limited as long as the touch panel display unit 54 includes the proximity sensing function.

The touch detector 62 notifies the CPU 59 of the fact that the touch of an electronic stylus, a finger, or the like is detected and an end of the touch (away) is detected. When detecting the proximity of an electronic stylus, a finger, or the like is detected and the end of the proximity (away) is detected, the non-touch detector 63 notifies the CPU 59 of the fact.

Figure 3:
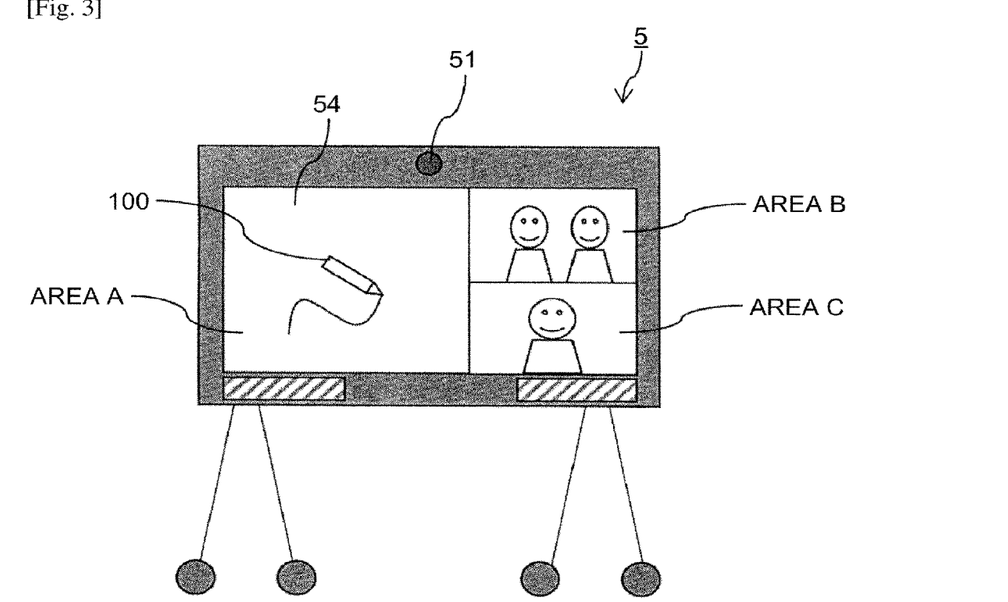
FIG. 3 is an explanatory view of the conference terminal provided with an interactive whiteboard.

FIG. 3 is an explanatory view of the conference terminal 5 provided with the touch panel display unit 54. The conference terminal 5 is configured by an interactive whiteboard, includes the touch panel display unit 54 (input display unit 60), and includes therein the microphone 52, the camera 51, the speaker 55, and the like. The touch panel display unit 54 may be configured as a separate device from the conference terminal 5 including the microphone 52, the camera 51, the speaker 55, and the like and may be connected to the conference terminal 5.

As illustrated in FIG. 3, the touch panel display unit 54 of the conference terminal 5 has a configuration enabling a direct drawing, by an electronic stylus 100 or a finger, on the touch panel display unit 54 and the written content can be shared with other locations concerned via the network. Besides, an image of the own site and an image of the connected party are displayed in the touch panel display unit 54. FIG. 3 illustrates a display layout in which an area A indicates a drawing area, an area B indicates an area of displaying a video of the site of the counterparty, and an area C indicates an area of displaying a video of the own site.

The speaker 55 outputs, by sounds, audio data input from the CPU 59. A built-in speaker and an external speaker of a USB type or an analog type can be used for the speaker 55. Alternatively, a speaker array unit including a plurality of speakers can also be used.

The storage device 56 records programs that enable the conference terminal 5 to operate, and realize various functions included in the conference terminal 5, data to be used in the middle of execution of those programs, and the like. The storage device 56 is, for example, realized by an information recording medium such as an updatable/recordable flash memory, a built-in hard disk or a hard disk connected via a data communication terminal, and a memory card and a reading/writing device of the information recording medium, and an appropriate storage device can be adopted and used depending on the intended purpose.

The memory 57, which is used as a work memory of the CPU 59, includes a memory area in which programs to be executed by the CPU 59 are expanded or data to be used during the execution of the programs is temporarily retained. For example, a volatile memory like a DDR memory can be used.

The LAN I/F unit 58, which performs data communication with the outside (the server 3, for example), is connected to the network N via LAN and transmits/receives video data, drawing data, audio data, and the like with the conference terminal 5 at the counterparty via the server 3. For the LAN I/F unit 58, appropriate techniques such as technique (wired LAN) of performing control for 10BASE-T, 100BASE-TX, and 1000BASE-T for the connection to Ethernet (registered trademark) and a technique (wireless LAN) of performing control for IEEE 802.11a/b/g/n can be adopted and used depending on a connection form.

The CPU 59 includes a mode switching controller 70 that controls mode switching between "video priority mode" and "drawing priority mode", which will be explained later, a video data processor 71 that performs various processes with video data, a drawing data processor 72 that performs various processes with drawing data, and an audio data processor 73 that performs various processes with audio data.

The CPU 59 provides instructions to each of the parts constituting the conference terminal 5 and transfers data to generally control the operation of the conference terminal 5 based on the video data input from the camera 51, the drawing data written in the touch panel display unit 54, the audio data input from the microphone 52, the video data, drawing data, and audio data from the conference terminal 5 at the counterparty, input from the LAN I/F unit 58, data input from the operation unit 53, programs and data recorded in the storage device 56, and the like.

For example, the CPU 59 repetitively and collaterally performs transmitting the video data, the drawing data, the audio data to the server 3 after the connection of the communication with the server 3 is established in response to the calling by the server 3; and receiving the video data, drawing data, and audio data from the conference terminal 5 at the counterparty, transferred from the server 3.

Specifically, the CPU 59 encodes the video data input as needed from the camera 51 during the teleconference, the drawing data input as needed from the touch panel display unit 54, and the audio data input as needed from the microphone 52, and outputs the encoded data to the LAN I/F unit 58, to transmit the data to the server 3. The CPU 59 performs, for example, coding and decoding by standards such as H.264/AVC and H.264/SVC.

The CPU 59 collaterally receives the video data, drawing data, audio data, and the like transmitted from the conference terminal 5 at the counterparty and transferred by the server 3 via the LAN I/F unit 58. The CPU 59 includes the coding/decoding function of decoding and transmitting to the touch panel display unit 54 and the speaker 55 the received data. The images and sounds input from the conference terminal 5 at the counterparty are thus reproduced and content written in the conference terminal 5 at the counterparty is displayed.

While the example in which the video data processor 71, the drawing data processor 72, and the audio data processor 73 are provided in the inside of the CPU 59 is explained in the embodiment, those units may be configured as external modules of the CPU 59.

Mode Switching Control

As explained already, in the conference terminal 5 using the interactive whiteboard, the kind of important information differs depending on the use scene. For example, in a conference of making a discussion with a user at the site of the counterparty, the important information is video and audio, and in a conference of making explanations by inserting additional writings such as descriptions and notes onto drawings and documents, the important information is drawing content.

However, so far, the amount of each piece of data and resource distribution in a network bandwidth are not particularly taken into consideration and a network bandwidth is used by a distribution allocated in advance for each piece of data in the use scene where video and audio are of importance and in the use scene where drawing content is of importance.

Therefore, there is a case where video data deteriorates in image quality to be lower than required while the drawing data (written content) to be displayed has an image quality higher than required in the use scene where video and audio are of importance. Besides, there is another case where the drawing data to be displayed deteriorates in image quality to be lower than required while the video data has a high image quality in the use scene where the drawing content is of importance.

To deal with those cases, while a control of changing the allocation of bandwidth by an operation, by a user, of the operation unit 53 depending on the use scene can be considered, it is troublesome and not realistic for the user to make an operation for a mode selection and the like each time when the use scene changes.

The information processing apparatus (conference terminal 5) according to the embodiment is provided with an imaging unit (the camera 51) that images a predetermined range, a video data processor (the video data processor 71) that processes video data input from the imaging unit, an input display unit (the touch panel display unit 54) that displays the video data and the drawing data input from another information processing apparatus (conference terminal 5) connected and receives writing, a drawing data processor (the drawing data processor 72) that processes the drawing data written onto the input display unit, and a transmitter (the CPU 59 and the LAN I/F unit 58) that transmits the video data processed by the video data processor and the drawing data processed by the drawing data processor to the another information processing apparatus connected. The information processing apparatus (the conference terminal 5) is also provided with a detector (the non-touch detector 63 and the like) that detects presence/absence of a writing action onto the input display unit. At least one of the video data processor and the drawing data processor is configured to execute changing the amount of the data to be processed, i.e., video data or drawing data from a predetermined level, depending on the presence/absence (detection) of the writing action detected by the detector. Here, the "writing action" includes, in addition to an action of actually performing writing onto the input display unit, an action before and after the actual writing action (auxiliary action). Here, what is explained in parentheses indicates a reference symbol and an application example in the embodiment.

Setting for Video Priority Mode and Drawing Priority Mode

Figure 4:
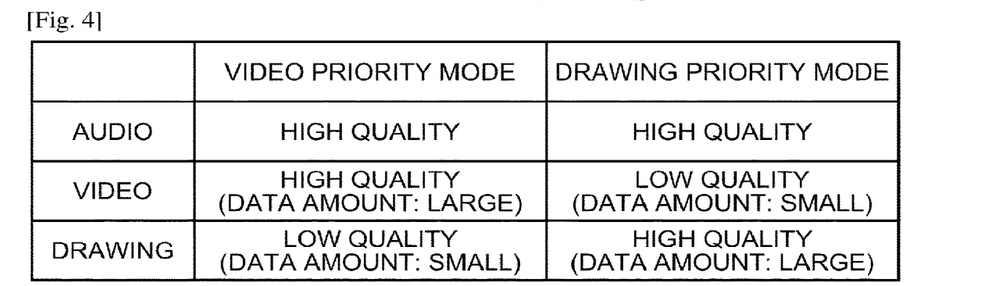
FIG. 4 is an explanatory view illustrating an example of setting for a video priority mode and a drawing priority mode.

FIG. 4 is an explanatory view illustrating an example of setting for the "video priority mode" and the "drawing priority mode". In the embodiment, the "video priority mode" (first mode) is set in the use scene where discussion is made with a user at the site of the counterparty. The "drawing priority mode" (second mode) is set in the use scene where explanations are made by inserting descriptions and notes onto drawings and documents.

The switching between the "video priority mode" and the "drawing priority mode" is automatically executed by a mode switching control by the mode switching controller 70.

In the embodiment, audio data is configured to have high quality, video data high quality, and drawing data low quality in the "video priority mode". Audio data is configured to have high quality, video data low quality, and drawing data high quality in the "drawing priority mode". These processing are executed in each of the video data processor 71, the drawing data processor 72, and the audio data processor 73.

"High quality" here indicates setting a coding parameter that realizes high quality in a standard used for encoding and "low quality" indicates setting an encoding parameter that realizes low quality in a standard used for encoding.

In setting the encoding parameter that realizes high quality, using a bandwidth not less than a bandwidth distributed to each data is included and in setting the encoding parameter that realizes low quality, the fact that transmission/reception in a bandwidth not more than the bandwidth distributed to each data is available is included.

"High quality" and "low quality" are used in a relative sense and "high quality" does not necessarily indicate including the execution of special processing to realize "high quality", for example. "Low quality" may indicate the execution of reducing a data amount from a normal data amount and "high quality" may indicate maintaining the normal data amount, for example. Conversely, "low quality" does not necessarily include the execution of special processing to realize "low quality". For example, "low quality" may indicate maintaining the normal data amount and "high quality" may indicate the execution of increasing the data amount from the normal data amount.

The encoding parameter for video data and drawing data, for example, includes a resolution, a bit rate, an S/N ratio, a frame rate, and the like. The encoding parameter for audio of audio data includes, for example, a bit rate. A plurality of parameters may be changed in the setting for the encoding. The order of degree of importance of the encoding parameter of video data and drawing data is (1) resolution, (2) bit rate and S/N ratio, and (3) frame rate and it is most preferable to change the resolution first in trying to realize low quality, for example.

By making audio data high quality, video data high quality, and drawing data low quality in the "video priority mode", it is possible to obtain high-quality voice and expression, on which importance is placed in this use scene, of a speaker at the site of the counterparty. For example, since the audio is clear and the video resolution is high, a block noise is reduced and a movement is smooth, so that smooth communication is established with a good understanding of the expression of the other party.

In contrast, by making audio data high quality, video data low quality, and drawing data high quality in the "drawing priority mode", it is possible to obtain high-quality audio and drawing content, on which importance is placed in this use scene. For example, since the audio is clear and the drawing resolution is high, a block noise is reduced and a letter collapse, a stroke delay, and the like are reduced without frame rate delay.

Here in the embodiment, audio data is made high quality in both of the "video priority mode" and the "drawing priority mode". This is because audio data is of importance in both use scenes, the data amount of the audio data is smaller than that of the video data and the drawing data, and the like, however, processing of reducing the data amount of the audio data may be performed similarly to the video data to further reduce the data amount in the "drawing priority mode".

Setting for Display Layout

Figure 5A:
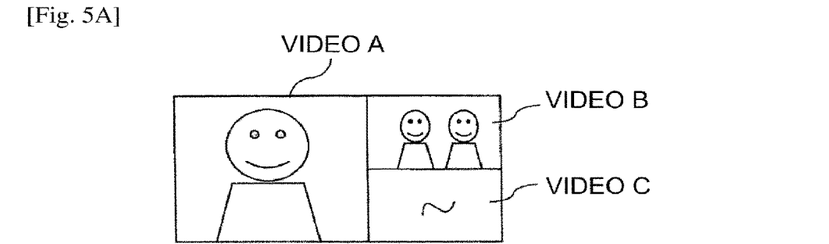
FIG. 5A illustrates the video priority mode in a display layout of a touch panel display unit.
Figure 5B:
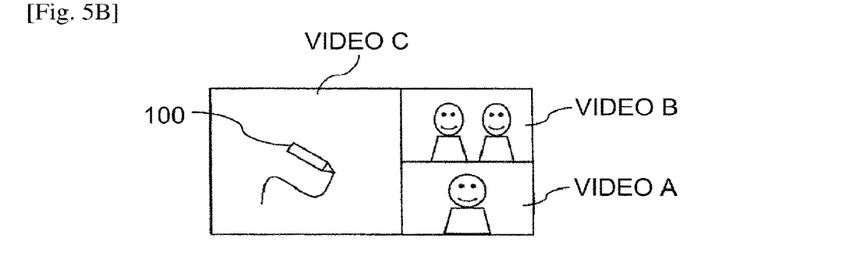
FIG. 5B illustrates the drawing priority mode in the display layout of the touch panel display unit.

Next, a display layout of the touch panel display unit will be explained. FIGS. 5A and 5B illustrate examples of display layout of the touch panel display unit 54. FIG. 5A illustrates a display layout in a case of the "video priority mode" and FIG. 5B illustrates a display layout of a case of the "drawing priority mode".

In the "video priority mode" illustrated in FIG. 5A, video (video A) at the site of the counterparty is displayed in the biggest size and a video (video B) of the own site and drawing content (figure and drawing) (video C) are displayed in a small size. Since being transmitted with high quality in the "video priority mode", the video data is displayed as a clear video even when compound and displayed in a big size.

When the "video priority mode" is switched to the "drawing priority mode" illustrated in FIG. 5B, the display layout is changed, the drawing content (video C) is displayed in the biggest size, and the video (video B) at the own site and the video (video A) at the site of the counterparty are displayed in a small size. Since being transmitted with high quality in the "drawing priority mode", the drawing data is displayed as a clear drawing content even when compound and displayed in a big size.

While the switching between the "video priority mode" and the "drawing priority mode" is automatically executed by the mode switching control by the mode switching controller 70 here, it is possible by changing the display layout together in the mode switching to allow a user to recognize that drawing is started and to prevent the user from failing to watch and listen at the start of the explanation using the drawing.

Mode Switching Control

Next, the mode switching control between the "video priority mode" and the "drawing priority mode" will be explained.

Figure 6:
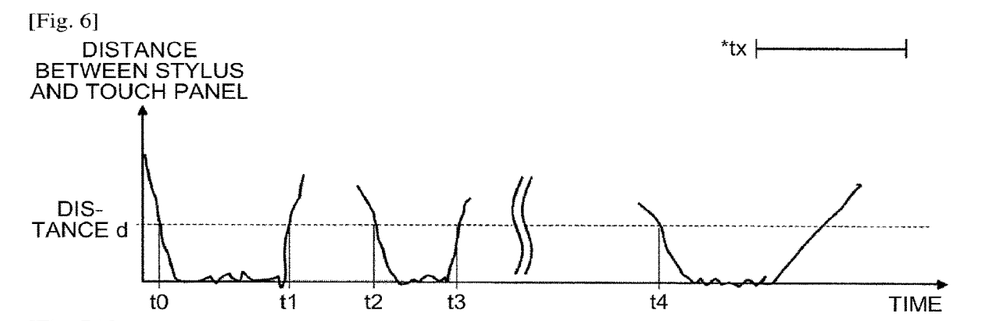
FIG. 6 is a chart illustrating a relation between a time and a distance between the touch panel display unit and an electronic stylus.

First, the hover detection of the non-touch detector 63 in the touch panel display unit 54 will be explained. FIG. 6 is a chart illustrating a relation between a time (horizontal axis) and a distance (longitudinal axis) between the touch panel display unit 54 and the electronic stylus 100 in a case where the user makes the electronic stylus 100 close to and come in touch with the touch panel display unit 54 (input display unit 60) and then makes the electronic stylus 100 away therefrom. While writing in the case of using the electronic stylus 100 is explained unless otherwise specified in the explanation below, the same control applies in a case of hand writing.

As illustrated in FIG. 6, when the electronic stylus 100 is made closer to the touch panel display unit 54 (0 to 0), the distance between the electronic stylus 100 and the touch panel display unit 54 comes to be smaller. At the time point (0) when the distance therebetween becomes a distance d, the distance comes within reach of the hover detection by the non-touch detector 63.

During the time (0 to 0), the "video priority mode" is set. At the time when the hover detection is made (0), it is determined to start to draw (perform a writing action) (start to use the touch panel) and the mode is switched to the "drawing priority mode".

By being made close, the electronic stylus 100 comes in touch with the touch panel display unit 54 and drawing is performed in a state where the distance between the touch panel display unit 54 and the electronic stylus 100 is approximately zero.

When the drawing is ended and the electronic stylus 100 comes away from the touch panel display unit 54, the distance between the touch panel display unit 54 and the electronic stylus 100 comes to be larger and comes out of the reach of the hover detection by the non-touch detector 63 (1).

During the time (0 to 1), the "drawing priority mode" is set. At the time point (1) when the hovering is not detected, it is determined that the drawing is ended (usage of the touch panel is ended).

As is often the case with the electronic stylus 100 in an actual drawing, the electronic stylus 100 is not continuously in touch with the touch panel display unit 54, gets away from the touch panel display unit 54 once, and soon proceeds with the touch (drawing). It is therefore preferable to determine whether it is a temporary stop of the drawing or an end of the drawing. In the embodiment, a setting value tx is set as a threshold for the determination.

In the example illustrated in FIG. 6, the period from the drawing stop (1) to the start of the next drawing (2) is shorter than the setting value tx and it is determined in this case that the touch panel is temporarily out of use and the "drawing priority mode" is maintained.

On the other hand, the period from the drawing stop (3) to the start of the next drawing (4) is longer than the setting value tx, it is determined in this case that the usage of the touch panel ends, and the mode is switched to the "video priority mode". It is only necessary that the switching is made after an elapse of the setting value tx.

Here, the setting value tx may be a given value set in advance or may be set by a user. It is preferable that the setting value tx be a value based on statistical information obtained by accumulating a usage time of the touch panel. It is possible in this case to set a value depending on a usage of the user. Here, the setting value tx may not be set and the mode may be switched for each start/stop of the drawing. It is possible, by setting the setting value tx, to prevent a frequent change of the display layout in changing the display layout for each mode.

In this manner, by detecting an auxiliary action before the touch on the touch panel display unit 54 (hover detection) and performing a mode switch based on a result of the detection as a trigger, it is possible to display a high-quality drawing content at the site of the counterparty from the time right after the start of usage of the touch panel.

While the example of using the touch panel display unit 54 capable of the hover detection is explained in the embodiment, the hover detection is not essential and the start/end of the drawing may be determined based on the detection of the touch/non-touch onto the touch panel display unit 54. In this case, it is possible to apply a touch panel not capable of the hover detection.

The determination of the start/end of the drawing is not limited to the hover detection with (or a touch detection onto) the touch panel display unit 54. For example, a movement of a user is detected based on data obtained by the imaging by the camera 51 and the writing action by the user onto the touch panel display unit 54 may be detected. Besides, in a case where a button to be depressed during the writing or the like is provided in the electronic stylus 100, whether this button is depressed or not may be used for the determination of the start/end of the drawing.

Figure 7A:
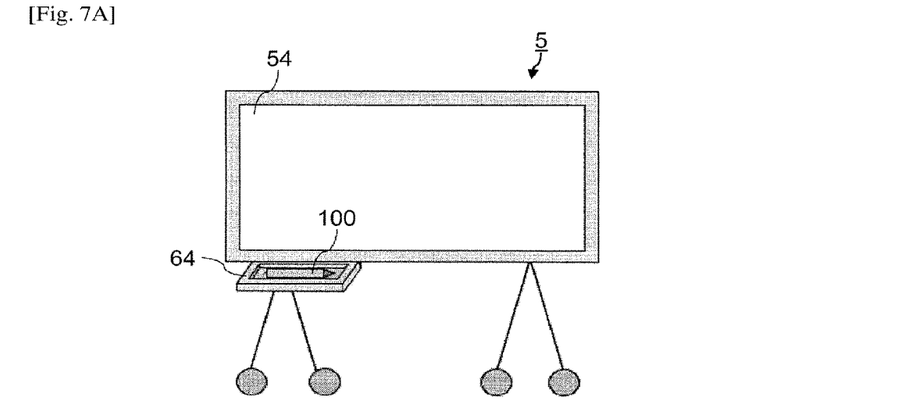
FIG. 7A illustrates an example of the conference terminal provided with an interactive whiteboard.
Figure 7B:
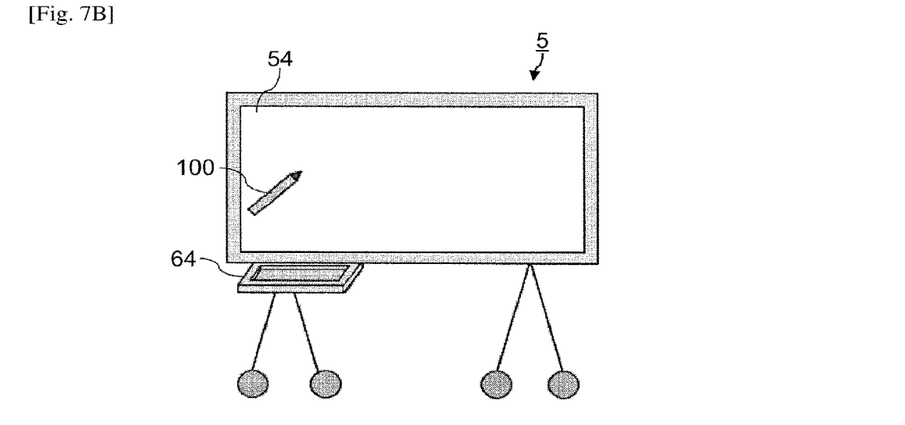
FIG. 7B illustrates another example of the conference terminal provided with an interactive whiteboard.

In addition, it is preferable to detect an auxiliary action for the usage of the electronic stylus 100 in a method to be explained below. FIGS. 7A and 7B illustrate examples of the conference terminal 5 provided with the touch panel display unit 54. The conference terminal 5 illustrated in FIGS. 7A and 7B is provided with the touch panel display unit 54 (input display unit 60) and an electronic stylus tray 64 as a tray unit on which the electronic stylus 100 is placed at a lower part of the touch panel display unit 54. Here, the illustration of the microphone 52, the camera 51, the speaker 55, and the like is omitted. The position where the electronic stylus tray 64 is provided is not limited to the examples in FIGS. 7A and 7B.

The electronic stylus tray 64 includes a function as a detector that detects whether or not the electronic stylus 100 is placed on the electronic stylus tray 64 and notifies the CPU 59 of a result of the detection.

For the technique of detecting whether or not the electronic stylus 100 is placed on the electronic stylus tray 64, it is preferable that a communication technique of a non-touch IC card such as ISO/IEC 14443 Type A, B, ISO/IEC 18092 (NFC), and FeliCa (registered trademark) is applied to the electronic stylus 100 and the electronic stylus tray 64 to make the electronic stylus tray 64 function as a reader/writer and the electronic stylus 100 function as a tag. For example, when the NFC is applied, an NFC tag is provided in the electronic stylus 100 and an NFC tag reader is provided in the electronic stylus tray 64, and the NFC tag reader notifies the CPU 59 of the detection of the NFC tag.

It is thus possible in the conference terminal 5 to determine whether or not the electronic stylus 100 is placed on the electronic stylus tray 64.

Depending on whether or not the electronic stylus 100 is placed on the electronic stylus tray 64 on this occasion, it is possible to detect an auxiliary action for the usage of the electronic stylus 100. In other words, it is possible to determine that a writing action by a user onto the input display unit 60 is not made when the electronic stylus 100 is placed on the electronic stylus tray 64 as illustrated in FIG. 7A and the "video priority mode" is selected.

On the other hand, when the electronic stylus 100 is not placed on the electronic stylus tray 64 as illustrated in FIG. 7B, it is possible to determine that the electronic stylus 100 is at the state of being used by the user (in other words, the user is in the middle of drawing and in the middle of auxiliary action before or after the drawing) and the "drawing priority mode" is selected.

In this manner, it is possible to make the switching between the "video priority mode" and the "drawing priority mode" depending on the action, by the user, of taking the electronic stylus 100 from the electronic stylus tray 64 and putting the electronic stylus 100 on the electronic stylus tray 64. According to this method of detecting the auxiliary action, it is possible, by using an action that the user is required to make to perform the drawing using the electronic stylus 100, to automatically switch the mode and therefore it is possible for the user to make the switching to the mode suitable for the use scene automatically.

Figure 8:
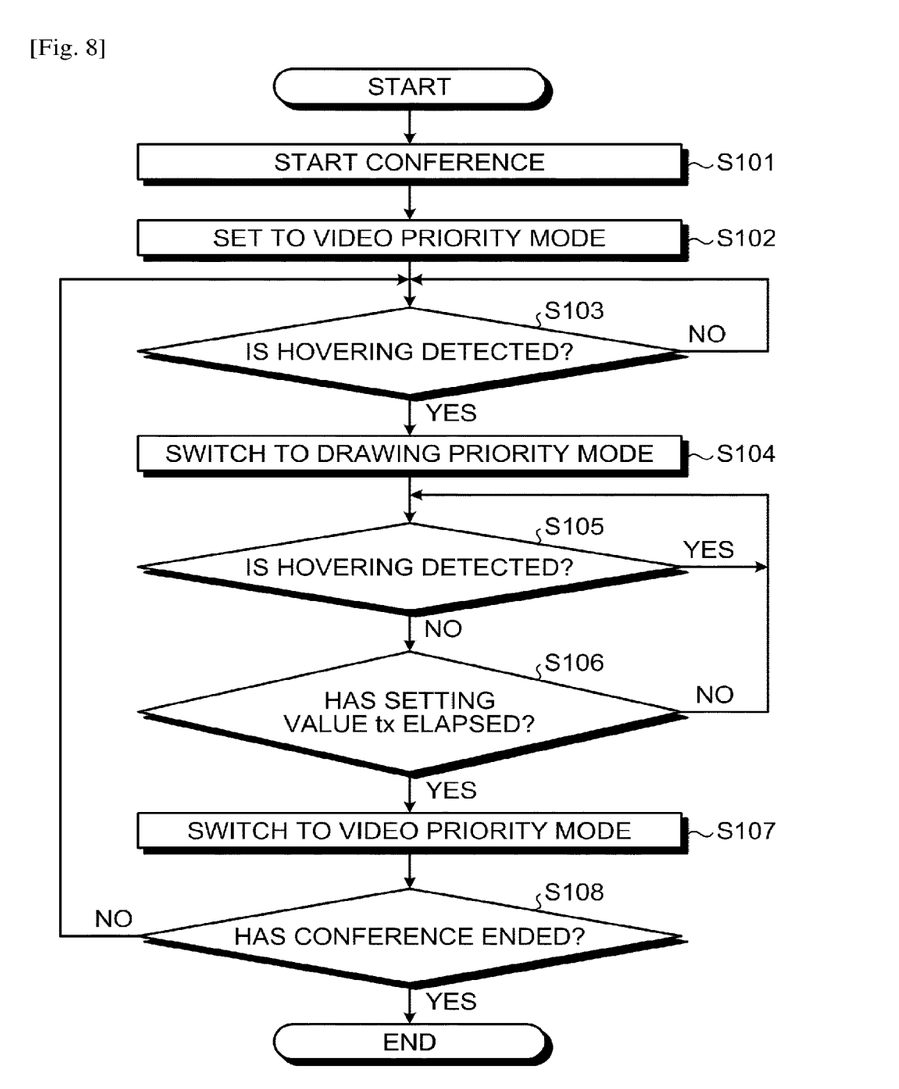
FIG. 8 is a flowchart illustrating an example of a mode switching control.

FIG. 8 is a flowchart illustrating an example of the mode switching control. Here, the case of the hover detection explained in FIG. 6 is taken as an example and will be explained. First, when a conference is started (step S101), the "video priority mode" is set (step S102). Next, whether the hovering is detected is determined (step S103). When hovering is not detected ("No" at step S103), the "video priority mode" is maintained.

On the other hand, when hovering is detected ("Yes" at step S103), the mode is switched to the "drawing priority mode" (step S104).

In the state where the mode is switched to the "drawing priority mode", whether hovering is detected is determined (step S105), and whether the drawing is continued is determined when hovering is detected ("Yes" at step S105). On the other hand, when hovering is not detected ("No" at step S105), whether the setting value tx has elapsed is determined (step S106).

When the setting value tx has not elapsed ("No" at step S106), it is determined that the drawing is in temporary stop. On the other hand, when the setting value tx has elapsed ("Yes" at step S106), it is determined that the drawing is ended and the mode is again switched to the "video priority mode" (step S107). The processing so far is to be repeated until the conference ends (step S108).

While the switching between the "video priority mode" and the "drawing priority mode" is automatically executed by the mode switching control explained above, the mode switched automatically may be set to a desired mode by an operation through the operation unit 53 by the user. Besides, it is preferable to enable ON/OFF setting for the execution itself of the mode switching control between the "video priority mode" and the "drawing priority mode". It is also preferable to make the mode setting of a terminal at the counterparty changeable with each other between/among the sites concerned.

As explained so far, on the occasion of determining encoding parameters of data stream to be transmitted to the site (or the server) at the counterparty in the conference terminal using the interactive whiteboard in the embodiment, a user's auxiliary action of the usage of the touch panel is detected and the encoding parameters for video, audio, and drawing onto the interactive whiteboard are changed based on the detected auxiliary action as a trigger.

For example, when an auxiliary action of the usage of the interactive whiteboard is detected, it is determined that the important information in the teleconference is drawing, a compression ratio for video is increased (image quality and a frame rate are reduced) and a compression ratio for drawing is reduced (image quality and a frame rate are not reduced) to suppress the data amount of the video, and the suppressed data amount is allocated to the drawing, so that the quality of the drawing decoded in the site at the reception side is increased to the maximum.

On the other hand, the auxiliary action of the usage of the interactive whiteboard is not detected, it is determined that the important information in the teleconference is video, a compression ratio for drawing is increased (image quality and a frame rate are reduced) and a compression ratio for video is reduced (image quality and a frame rate are not reduced) to suppress the data amount of the drawing, and the suppressed data amount is allocated to the video, so that the quality of the video decoded in the site at the reception side is increased to the maximum.

It therefore becomes possible to increase the quality of data to be of importance depending on the use scene without an operation by a user.

Although the embodiment has been described as an example of a preferable embodiment, the invention is not limited thereto and is to be construed as embodying various modifications and alternative constructions within the basic teaching of the invention.

According to an embodiment, it is possible to enable communication in data quality suitable for use scene by executing data processing suitable for the use scene with respect to each of video data and drawing data.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

REFERENCE SIGNS LIST

1 Teleconference system
3 Server
4 Conference reservation server
5 Conference terminal
51 Camera
52 Microphone
53 Operation unit
54 Touch panel display unit
55 Speaker
56 Storage device
57 Memory
58 LAN I/F unit
59 CPU
60 Input display unit
61 Coordinate output unit
62 Touch detector
63 Non-touch detector
64 Electronic stylus tray
70 Mode switching controller
71 Video data processor
72 Drawing data processor
73 Audio data processor
100 Electronic stylus
N Network

What is claimed is:
1. An information processing apparatus, comprising:
an imaging unit configured to image a predetermined range;
video data processing circuitry configured to process video data output from the imaging unit;
an audio input unit configured to receive audio;
audio data processing circuitry configured to process audio data output from the audio input unit
an input display unit configured to display video data and drawing data received from another information processing apparatus, and receive writing;
drawing data processing circuitry configured to process drawing data written onto the input display unit;
a transmitter configured to transmit, to the other information processing apparatus, the video data having been processed by the video data processing circuitry and the drawing data having been processed by the drawing data processing circuitry;

a detector configured to detect whether a writing action is performed on the input display unit; and processing circuitry configured to set either a first mode or a second mode, the first mode being set for a first period during which the writing action is not performed onto the input display unit, and the second mode being set for a second period during which the writing action is performed onto the input display unit, wherein at least one of the video data processing circuitry and the drawing data processing circuitry is configured to change an amount of the video data or the drawing data to be processed from a predetermined level, depending on the detection of the writing action by the detector, the video data processing circuitry is further configured to reduce an amount of the video data to be processed while in the second mode to be smaller than an amount of the video data to be processed while in the first mode, in response to the processing circuitry setting the second mode, the drawing data processing circuitry is further configured to reduce an amount of the drawing data to be processed while in the first mode to be smaller than an amount of the drawing data to be processed while in the second mode, in response to the processing circuitry setting the first mode, and the audio data processing circuitry is configured to perform one of (1) a same processing on the audio data in the first mode as in the second mode, and (2) reducing an amount of the audio data in the second mode so as to be smaller than an amount of the audio data in the first mode.

2. The information processing apparatus according to claim 1, wherein each of the video data processing circuitry and the drawing data processing circuitry is further to change a usage bandwidth allocated to the video data and the drawing data to be processed, respectively, depending on the detection of the writing action by the detector.

3. The information processing apparatus according to claim 1, wherein the processing circuitry is further configured to switch from the second mode to the first mode when a predetermined period of time has elapsed after the writing action is no longer detected while in the second mode.

4. The information processing apparatus according to claim 1, wherein the input display unit is configured to detect, without touch, a writing object by which the writing action is performed onto the input display unit.

5. The information processing apparatus according to claim 1, further comprising:

a tray in which an electronic writing device for writing onto the input display unit is placed, wherein the detector is further configured to detect whether the writing action is performed, depending on whether the electronic writing device is placed in the tray.

6. The information processing apparatus according to claim 1, wherein the video data processing circuitry and the drawing data processing circuitry are further configured to change at least one of a resolution, a bit rate, an S/N ratio, and a frame rate.

7. The information processing apparatus according to claim 1, wherein the processing circuitry is further configured to determine a layout of a screen to be displayed in the input display unit, depending on whether the first mode or the second mode is set.

8. A conference system comprising a plurality of information processing apparatuses each comprising:

an imaging unit configured to image a predetermined range;

video data processing circuitry configured to process video data output from the imaging unit;

an audio input unit configured to receive audio;

audio data processing circuitry configured to process audio data output from the audio input unit;

an input display unit configured to display video data and drawing data received from another information processing apparatus, and receive writing;

drawing data processing circuitry configured to process drawing data written onto the input display unit;

a transmitter configured to transmit, to the other information processing apparatus, the video data having been processed by the video data processing circuitry and the drawing data having been processed by the drawing data processing circuitry;

a detector configured to detect whether a writing action is performed on the input display unit; and processing circuitry configured to set either a first mode or a second mode, the first mode being set for a first period during which the writing action is not performed onto the input display unit and the second mode being set for a second period during which the writing action is performed onto the input display unit, wherein at least one of the video data circuitry and the drawing data processing circuitry is configured to change an amount of the video data or the drawing data to be processed from a predetermined level, depending on the detection of the writing action by the detector, the video data processing circuitry is further configured to reduce an amount of the video data to be processed while in the second mode to smaller than an amount of the video data to be processed while in the first mode, in response to the processing circuitry setting the second mode, the drawing data processing circuitry is further configured to reduce an amount of the drawing data to be processed while in the first mode to smaller than an amount of the drawing data to be processed while in the second mode, in response to the processing circuitry setting the first mode, the video data and the drawing data are transmitted and received between the plurality of information processing apparatuses, and the audio data processing circuitry is configured to perform one of (1) a same processing on the audio data in the first mode as in the second mode, and (2) reducing an amount of the audio data in the second mode so as to be smaller than an amount of the audio data in the first mode.

9. A control method for an information processing apparatus that includes an imaging unit configured to image a predetermined range, video data processing circuitry configured to process video data output from the imaging unit, an audio input unit configured to receive audio, audio data processing circuitry configured to process audio data output from the audio input unit, an input display unit configured to display video data and drawing data received from another information processing apparatus, and receive writing, drawing data processing circuitry configured to process drawing data written onto the input display unit, and a transmitter configured to transmit, to the other information processing apparatus, the video data having been processed by the video data processing circuitry and the drawing data having been processed by the drawing data processing circuitry, the control method comprising:

detecting whether a writing action is performed on the input display unit; and     changing an amount of at least one of the video data and the drawing data to be processed from a predetermined level, depending on the detection of the writing action;

setting either a first mode or a second mode, the first mode being set for a first period during which the writing action is not performed onto the input display unit, and the second mode being set for a period during which the writing action is performed onto the input display unit;

in response to the second mode being set, reducing an amount of the video data to be processed while in the second mode to be smaller than an amount of the video data to be processed while in the first mode;

in response to the first mode being set, reducing an amount of the drawing data to be processed while in the first mode to be smaller than an amount of the drawing data to be processed while in the second mode; and     performing one of (1) a same processing on the audio data in the first mode as in the second mode, and (2) reducing an amount of the audio data in the second mode so as to be smaller than an amount of the audio data in the first mode.

10. The information processing apparatus of claim 1, wherein, in response to the processing circuitry setting the second mode, the video data processing circuitry is further configured to reduce the resolution of the video data.

11. The information processing apparatus of claim 1, wherein, in response to the processing circuitry setting the first mode, the drawing data processing circuitry is further configured to reduce the resolution of the drawing data.

* * * * *